(12) United States Patent
Halcomb et al.

(10) Patent No.: US 7,072,824 B2
(45) Date of Patent: Jul. 4, 2006

(54) METHOD AND APPARATUS FOR EMULATING A PROCESSOR

(75) Inventors: Herbert Wayne Halcomb, Naperville, IL (US); Marlon Zbigniew Kasprzyk, Winfield, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 1044 days.

(21) Appl. No.: 09/851,898

(22) Filed: May 9, 2001

(65) Prior Publication Data

US 2002/0170030 A1 Nov. 14, 2002

(51) Int. Cl.
*G06F 9/455* (2006.01)
(52) U.S. Cl. ....................................... 703/28
(58) Field of Classification Search .................. 703/28
See application file for complete search history.

(56) References Cited

U.S. PATENT DOCUMENTS 4,903,199 A * 2/1990 Keenan et al. .............. 717/134
6,230,119 B1 * 5/2001 Mitchell ...................... 703/27

OTHER PUBLICATIONS

Lewis, David M.; Galloway, David R.; van Ierssel, Marcus; Rose, Jonathan; Chow, Paul; "The Transmogrifier-2: A 1 Million Gate Rapid-Prototyping System", Jun. 1998, IEEE Transactions on Very Large Scale Integration Systems.*
"Flex 10K Device Family", Mar. 2000, web.archive.org/web/20000303160208/www.altera.com/html/products/f10k.html.*
Wray, William C.; Greenfield, Joseph D; "Using microprocessors and microcomputers: the Motorola family", 1994, Prentice-Hall.*
Brynjolfson, Ian; Zilic, Zeljiko; "Dynamic Clock Management for Low Power Applications in FPGAs", 2000, Proceedings of the IEEE 2000 Custom Integrated Circuits Conference, May 21-24, 2000 pp. 139-142.*

* cited by examiner

*Primary Examiner*—Leo Picard
*Assistant Examiner*—Russ Guill

(57) ABSTRACT

One or more processor operations are emulated in a programmable logic device (PLD) (205) that selectively mimics processor behavior by a program that downloads (505) one or more processor operations into the PLD (205). Each operation may be selected (501) and repeated (513) continuously without interruption from any other processor operation unless such interruption is desired to take place. In addition, the PLD (205) has an adjustable or variable clock speed that provides for the ability to select (507) and change (511) the clock speed under which the test circuit is exercised.

17 Claims, 3 Drawing Sheets

METHOD AND APPARATUS FOR EMULATING A PROCESSOR

FIELD OF THE INVENTION

This invention relates to electronic circuits, including but not limited to emulation of processors.

BACKGROUND OF THE INVENTION

A processor, such as, for example, a central processing unit (CPU), microprocessor, or digital signal processor among others, is the part of an electronic device that provides logic and computation functions by interpreting and executing instructions that are typically stored in memory either within the processor or memory external to the processor. Processors are integrated into many different types of devices because of their flexibility and ability to provide a computational power and logic for many different types of electronic devices, such as computers, televisions, VCRs, cellular phones, CD players, remote controls, communication switches, base stations, and numerous other electronic devices that benefit from intelligence provided by a processor.

The processor is often considered the "heart" of a system by supplying intelligence via interaction with the circuitry with which it interfaces. This circuitry is often called peripheral circuitry. The peripheral circuitry is typically designed by the makers of different types of electronic devices. The peripheral circuitry must operate within the processor constraints, such as various busses protocols, timing, clock speed, and temperature, in order for the electronic device to be a successful product.

Because it is desirable to test the desired circuitry in an environment that provides helpful feedback to the designer, processor emulators are often utilized. Processor emulators mimic or imitate the processor's functionality, including all operations, as exactly as possible. These emulators often provide the user with the ability to stop the processor at a given clock cycle and read the processor's internal registers. In addition, emulators imitate the operational cycles of the processor. For example, when a processor utilizes a RISC (Reduced Instruction Set Computing) architecture, the processor alternates between the various operations that it provides, often leaving an operation before it is completed in order to perform another task prior to returning to the incomplete operation. In normal operation, such activity is not a problem because the speed of the processor is so fast that such interruptions are not noticeable to the user. When trying to debug a test circuit, however, such interruptions may delay the ability to test a particular operation because of the need to wait for the processor or its emulator to cycle back to a particular operation. It may not be predictable when the processor or emulator will return to a particular operation, making debugging with such a processor or its emulator very difficult. Existing emulators also do not provide the ability to select the processor operation to be tested.

Accordingly, there is a need for a processor emulator that efficiently tests processor operations even when the processor utilizes an interrupted or cyclic engagement of operations.

SUMMARY

A method of the present invention comprises the steps of selecting an operation that emulates at least one operation of a processor and downloading the operation into a programmable logic device. A clock speed is selected at which to operate the programmable logic device. The programmable logic device is programmed to operate at the clock speed. The operation is repeatedly tested in combination with a circuit.

DESCRIPTION OF A PREFERRED EMBODIMENT

The following describes an apparatus for and method of emulating and isolating processor operations such that each operation may be called at will without being interrupted by other operations that may be called in a typical processor operation cycle. One or more processor operations are emulated in a programmable logic device (PLD) that selectively mimics processor behavior by a program that downloads one or more processor operations into the PLD. Each operation may be selected and repeated continuously without interruption from any other processor operation unless it is desired for such interruption to take place. In addition, the PLD has an adjustable or variable clock speed that provides for the ability to select and change the clock speed under which the test circuit is exercised.

Figure 1:
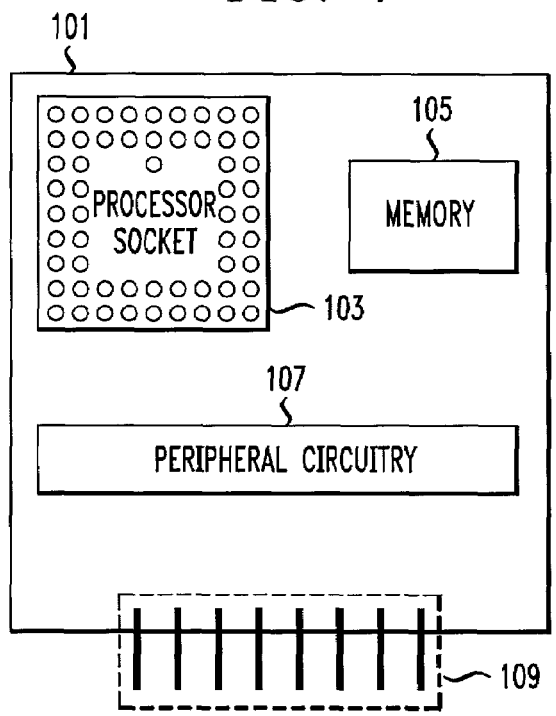
FIG. 1 is a block diagram of a test circuit board utilizing a processor in accordance with the invention.

A block diagram of a circuit board utilizing a processor is shown in FIG. 1. A circuit board 101 has a processor socket 103 and a memory device 105, such as RAM (Random Access Memory), ROM (Read Only Memory), EPROM (Erasable Programmable Read Only Memory), and so forth. Typically, the memory device 105 stores a program run by a processor that is plugged into a processor socket 103. The circuit board 101 may also contain peripheral circuitry 107 that interfaces between the processor, memory 150, and the circuit under test, which is typically off-board. The circuit under test may be any type of electronic circuit that interfaces to a processor. The circuit board 101 also contains input/output (I/O) pins 109 through which functions performed by the system on the circuit board 101 may interact with the outside world. Data, control, and any potential clock signal may be brought to the various devices 103, 105, and 107 on the board 101. Not shown in FIG. 1, for the sake of simplicity, are traces that are routed between the various parts 103, 105, 107, and 109 on the board and generally connect these parts together. Such traces are well known in the art and vary based on the type of circuit utilized.

Figure 2:
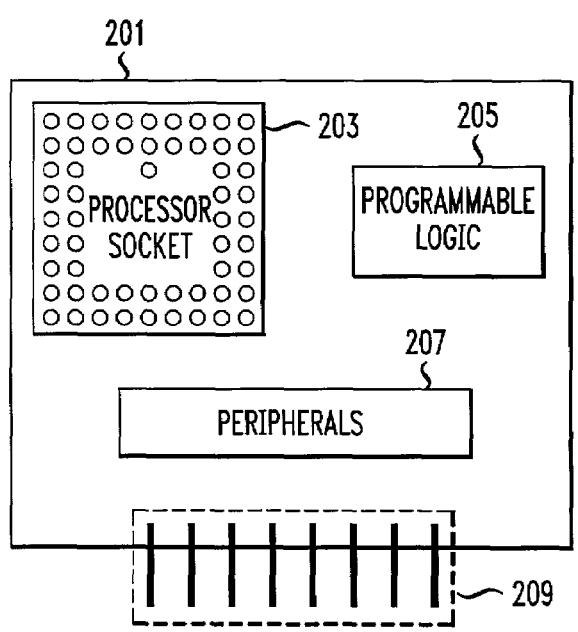
FIG. 2 is a block diagram of a processor emulator board in accordance with the invention.

A block diagram of a processor emulator board is shown in FIG. 2. The emulator circuit board 201 has a special processor socket 203, programmable logic device (PLD) 205, peripherals 207, and I/O pins 209. Data and control are input via the I/O pins 209 to any necessary peripherals 207 and the PLD 205. Such data and control include the program that codes the PLD 205 to emulate one or more processor operations. The control lines are utilized to select the PLD 205 operation(s) to be tested. The PLD 205 may also emulate other functions or operations in addition to or in place of the processor operations. In addition, any data utilized to test the programmable logic may also be input and/or output through the I/O pins.

The I/O pins 201 also provide a mechanism through which a clock speed is selected and programmed into the PLD 205, i.e., the speed at which the PLD 205 or emulated processor will operate. The clock speed may be adjusted at any time during the test process. The programmable logic device 205 advantageously has the same number of I/O pins as the processor socket 203 for ease of PLD 205 and circuit board 201 design. The PLD 205 may have more pins than the processor socket 203, and it may also have fewer pins than the processor socket, although such designs would likely require additional complexity that may not be efficient.

Figure 3:
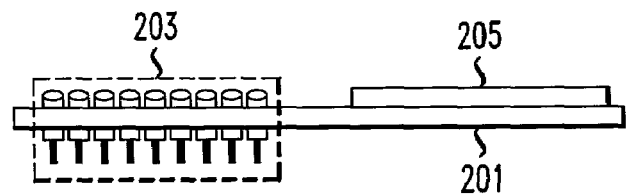
FIG. 3 is a side view of a processor emulator in accordance with the invention.

A side view of the emulator 201 is shown in FIG. 3. The processor socket 203 is shown to go through the board and have pins that extend below the board, such that the processor socket 203 plugs into the processor socket 103 of the main circuit board 101. The peripherals 207 and I/O pins 209 are not shown in FIG. 3 for the sake of simplicity.

Figure 4:
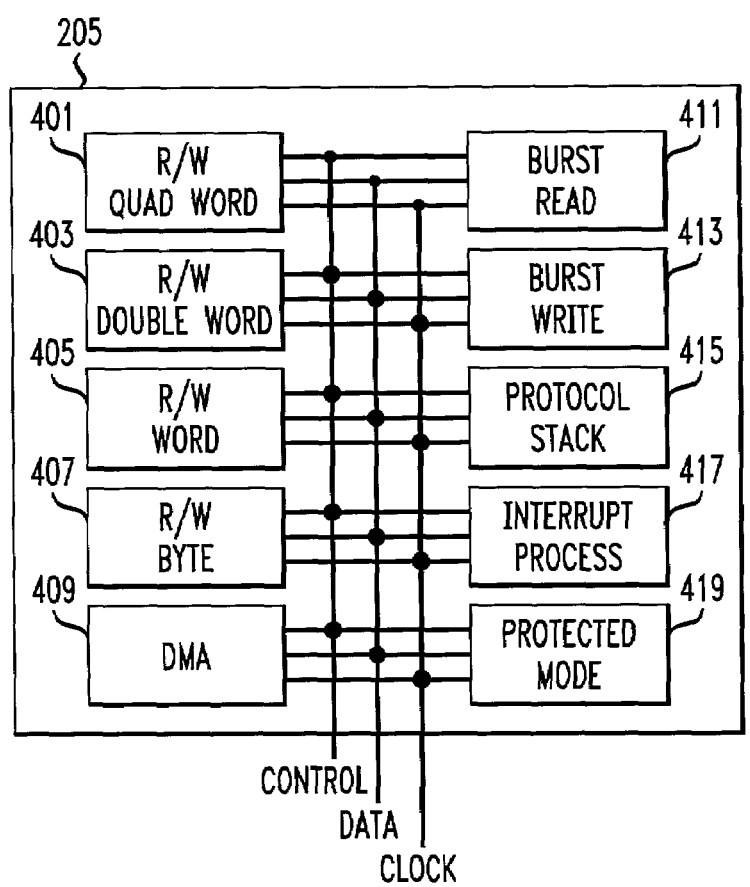
FIG. 4 is a block diagram of a programmable logic device in accordance with the invention.

A block diagram of an example PLD 205 is shown in FIG. 4. The PLD 205 may be, for example, a complex programmable logic device (CPLD) or a field programmable gate array (FPGA), such as CPLDs or FPGAs provided by Altera, Lattice, or Xilinx. The processor operations include any processor operation from any type of processor, including processor bus transactions. The example PLD 205 shown in FIG. 4 illustrates different types of processor operations that may be emulated in the PLD 205. In this example, a read/write quad word operation 401, a read/write double word operation 403, a read/write word operation 405, a read/write byte operation 407, a dynamic memory access (DMA) operation 409, a burst read operation 411, a burst write operation 413, a protocol stack operation 415, an interrupt process operation 417, and a protected (kernel) mode operation 419 are shown in this PLD 205.

Each operation of the PLD 205 is shown in a separate block to illustrate the isolation of each operation from the other operations. In this way, any particular processor operation may be invoked at any time and repeated as necessary until testing is complete. One or more control lines, one or more data lines, and one or more clock lines are connected to each of the PLD blocks 401 through 419. Thus, the PLD 205 may be utilized to test one or more processor operations at any speed in isolation, for example, to more quickly track down the cause of an intermittent problem. Such capabilities are not provided by prior emulators. The PLD 205 may also be programmed one or more operations at a time, as desired. In addition, combinations of operations may be tested at one time, for example, if it is desirable to test the interface between a burst read and a burst write or a long word write after a byte write, or to test EMI (ElectroMagnetic Interference) properties of the peripheral circuitry 107. The PLD 205 may emulate any processor, such as an IBM PowerPC™, Intel Pentium III™, Sun SPARC™, Motorola MC68020™, and so forth, and any processor type, including, for example, central processing units (CPUs), microprocessors, and digital signal processors.

Figure 5:
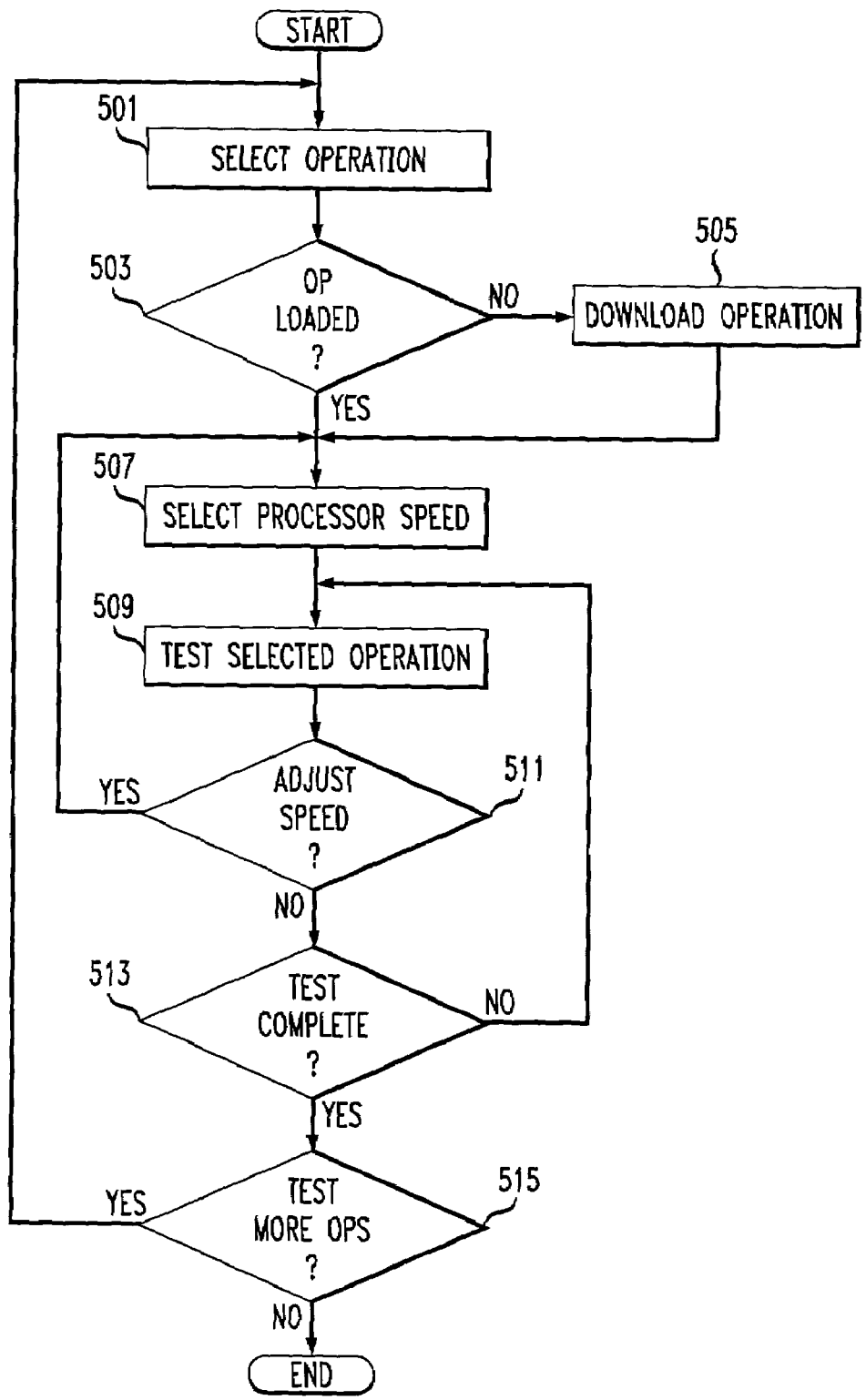
FIG. 5 is a flowchart showing a method of processor emulation in accordance with the invention.

A flowchart showing a method of processor emulation is shown in FIG. 5. At step 501, one or more operations are selected for test. At step 503, it is determined whether the selected operation(s) is (are) presently loaded in the PLD 205. If the operation(s) is (are) not loaded in PLD 205, the operations are downloaded into the PLD at step 505, in accordance with known procedures for downloading logic and/or circuitry into a PLD 205, and the process continues with step 507. If the operation(s) is (are) loaded at step 503, the process continues with step 507. Thus, the present invention provides for selectable downloading of operations in the PLD 205, which may be useful, for example, when the PLD 205 is not large enough to emulate the entire processor or when better processor characteristics, e.g., timing, are obtained by implementing/emulating only parts of the processor at one time. Steps 503 and 505 may not be necessary when all the processor operations are downloaded or pre-loaded into the PLD 205.

At step 507 the processor speed is selected and programmed into the PLD 205. The processor speed may be selected based on, for example, any physical constraints that the tester may be subject to, such as the speed at which a logic analyzer operates. At step 509, the selected operation is tested by executing the code as programmed into the PLD and providing any test data to the PLD via whatever means are necessary. Test results may also be returned via the same input/output devices. At step 511, if it is desired to adjust the speed of operation, the process continues with step 507. The speed may be adjusted up or down to accomplish a number of objectives. For example, the speed may be slowly increased until the circuit under test 109 begins to malfunction, in order to help identify circuit or design flaws. If it is not desired to adjust the speed at step 511, the process continues with step 513. If at step 513, testing of the selected operation(s) is not complete, the process continues with step 509, otherwise the process continues with step 515. At step 515, if there are more operations to test, the process continues with step 501, otherwise the process ends.

Although the present invention is shown in the example where processor operations are emulated, the present invention may also be used to emulate operations and functionality other than that of a processor, such as driving signals to high or low voltage for trace continuity tests or thermal stress analysis of devices.

The present invention provides advantageous way to emulate a processor or other device without having to wait through processor operation cycles that do not provide the operation under test. Such undesirable operational cycles may affect the state of memory or internal registers of the processor and may provide undesirable results or require extra time to set to a desirable state. The present invention provides the ability to select and isolate a processor operation in order to repeatedly test that operation without interrupt from undesirable operation cycles until the desired results are obtained. Because the clock speed of the PLD may be varied according to the desires of the tester, slower operational speeds may be utilized for testing. As a result, slower, and hence less expensive, test equipment may be utilized to analyze circuit under test and the test results. This feature is also useful when very high speed processors, e.g., over 1 GHz, are utilized, and test equipment may not yet exist. The present invention provides advantage over prior emulators that do not provide the ability to adjust the speed of the processor and must follow operation cycles that prohibit the ability to continuously test a single operation or group of operations without interruption from other operations, unless such interruption is desirable. The present invention also provides the ability to select and test any processor operation(s) that are desired. Because the PLD clock speed is adjustable, a wide range of speeds may be utilized with a test circuit in order to determine the clock speed at which a circuit will fail to operate properly. The present invention therefore provides a flexible yet efficient manner for testing devices that utilize processors or other complex circuitry without requiring expensive additional test equipment while reducing overall development time. The present invention provides for quick and efficient generation of test patterns through programming, utilizing standard VHDL (Very High speed Description Language) or VERILOG programming, of a PLD or FPGA that mimics a processor.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. An apparatus comprising:
    a programmable logic device, arranged and constructed to receive a program that programs at least one processor operation and a variable clock speed into the programmable logic device;
    at least one interface device through which the program and the variable clock speed are programmed into the programmable logic device;
    wherein the programmable logic device is arranged and constructed to adjust the variable clock speed during execution of the at least one processor operation;
    wherein the programmable logic device is arranged and constructed to emuate the at least one processor operation repeatedly without interruption from one or more cyclical processor operations other than the at least one operation of the processor.

2. The apparatus of claim 1, wherein the programmable logic device has as many pins as a processor for which the at least one processor operation is emulated.

3. A method comprising the steps of:
    selecting an operation that emulates at least one operation of a processor;
    downloading the operation into a programmable logic device;
    selecting a clock speed at which to operate the programmable logic device;
    programming the programmable logic device to operate at the clock speed;
    repeatedly testing the operation in combination with a circuit without waiting through processor operation cycles that do not provide the operation;
    adjusting the clock speed during the step of repeatedly testing the operation in combination with the circuit.

4. The method of claim 3, wherein the step of testing is performed in isolation of cyclical operations other than the at least one operation of the processor.

5. The method of claim 3, wherein the operation is one of read/write byte, read/write word, read/write double word, read/write quad word, burst read, burst write, dynamic memory access, protocol stack, interrupt process, and protected mode.

6. The method of claim 3, further comprising the step of pre-loading at least one operation into the programmable logic device.

7. The method of claim 3, further comprising the steps of determining whether the operation is loaded into the programmable logic device and when the operation is loaded into the programmable logic device, omitting the downloading step.

8. The method of claim 3, further comprising the step of forwarding test data to the programmable logic device.

9. The method of claim 3, further comprising the step of returning test results to a user.

10. The method of claim 3, wherein the method steps are implemented as computer readable program code recorded on a computer-readable signal-bearing medium as one or more executable processor instructions.

11. A computer-readable signal-bearing medium on which are recorded one or more executable processor instructions comprising:
    computer readable program code for downloading one or more processor operations into a programmable logic device;
    computer readable program code for selecting one of the one or more processor operations;
    computer readable program code for selecting a clock speed at which to operate the programmable logic device;
    computer readable program code for programming the programmable logic device to operate at the clock speed;
        computer readable program code for repeatedly executing the selected one of the one or more processor operations without waiting through one or more other processor operations of a precessor operation cycle that do not provide the selected one of the one or more processor operations; and
    computer readable program code for adjusting the clock speed while repeatedly executing the selected one of the one or more processor operations.

12. The computer readable signal bearing medium of claim 11, further comprising:
    computer readable program code for determining whether the selected one of the one or more processor operations is downloaded into the programmable logic device; and
    computer readable program code for downloading the selected one of the one or more processor operations into the programmable logic device when the selected one of the one or more processor operations is not downloaded into the programmable logic device.

13. The computer-readable signal-bearing medium of claim 11, wherein the computer readable program code for repeatedly executing the selected one of the one or more processor operations executes in isolation of cyclical operations other than the selected one of the one or more processor operations.

14. The computer-readable signal-bearing medium of claim 11, wherein the selected one of the one or more processor operations is one of read/write byte, read/write word, read/write double word, read/write quad word, burst read, burst write, dynamic memory access, protocol stack, interrupt process, and protected mode.

15. The computer-readable signal-bearing medium of claim 11, further comprising computer readable program code for pre-loading at least one operation into the programmable logic device.

16. The computer-readable signal-bearing medium of claim 11, further comprising computer readable program code for forwarding test data to the programmable logic device.

17. The computer-readable signal-bearing medium of claim 11, further comprising computer readable program code for returning test results to a user.

* * * * *